United States Patent
Witt et al.

(10) Patent No.: US 7,818,532 B2
(45) Date of Patent: *Oct. 19, 2010

(54) METHOD AND SYSTEM FOR CREATING AND RESTORING AN IMAGE FILE

(75) Inventors: Wesley Witt, Redmond, WA (US); Edward S. Miller, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/862,910

(22) Filed: Sep. 27, 2007

(65) Prior Publication Data

US 2008/0016304 A1    Jan. 17, 2008

Related U.S. Application Data

(63) Continuation of application No. 10/185,755, filed on Jun. 28, 2002, now Pat. No. 7,293,150.

(51) Int. Cl.
*G06F 12/00* (2006.01)

(52) U.S. Cl. .................. 711/170; 711/162; 711/165

(58) Field of Classification Search ........... 711/162, 711/202, 203, 170; 707/202, 204, 200, 205, 707/203

See application file for complete search history.

(56) References Cited

U.S. PATENT DOCUMENTS

| | | | |
|---|---|---|---|
| 5,276,860 A | 1/1994 | Fortier et al. | |
| 5,818,723 A | 10/1998 | Dimitri | |
| 5,907,672 A | 5/1999 | Matze et al. | |
| 5,930,828 A | 7/1999 | Jensen et al. | |
| 5,960,460 A | 9/1999 | Marasco et al. | |
| 5,966,730 A | 10/1999 | Zulch | |
| 5,991,542 A | 11/1999 | Han et al. | |
| 6,058,390 A | * 5/2000 | Liaw et al. | 707/2 |
| 6,092,128 A | 7/2000 | Maas et al. | |
| 6,108,697 A | 8/2000 | Raymond et al. | |

(Continued)

FOREIGN PATENT DOCUMENTS

CA    2234493    10/1999

(Continued)

OTHER PUBLICATIONS

European Search Report for European Patent Application No. 03013853.1 Mailed on Jan. 9, 2008 pp. 4.

(Continued)

*Primary Examiner*—Pierre-Michel Bataille
(74) *Attorney, Agent, or Firm*—Lee & Hayes, PLLC

(57) ABSTRACT

An image file format and a method of creating and restoring an image file is provided by the present invention. The image file format includes a plurality of streams such as a control stream, a data stream, a bitmap stream, and a cluster map stream. An audit trail stream, properties stream and fix-up stream may also be provided. The present invention allows the contents of a storage media to be captured and stored as an image file. The image file is used to restore the storage media to a previous state or allows multiple computers to be provided with a common configuration. The plurality of streams further allow the image file to be viewed, edited or otherwise manipulated.

25 Claims, 9 Drawing Sheets

U.S. PATENT DOCUMENTS

| | | |
|---|---|---|
| 6,205,527 B1 | 3/2001 | Goshey et al. |
| 6,256,673 B1 | 7/2001 | Gayman |
| 6,278,838 B1 | 8/2001 | Mendenhall et al. |
| 6,330,653 B1 | 12/2001 | Murray et al. |
| 6,424,999 B1 | 7/2002 | Arnon et al. |
| 6,477,624 B1 | 11/2002 | Kedem et al. |
| 6,477,629 B1 | 11/2002 | Goshey et al. |
| 6,505,216 B1 | 1/2003 | Schutzman et al. |
| 6,546,500 B1 | 4/2003 | Miyamoto |
| 6,658,436 B2 | 12/2003 | Oshinsky et al. |
| 6,684,229 B1 | 1/2004 | Luong et al. |
| 6,718,446 B1 | 4/2004 | Peters et al. |
| 6,948,039 B2 | 9/2005 | Biessener et al. |
| 7,111,115 B2 * | 9/2006 | Peters et al. ............. 711/112 |
| 7,185,169 B2 | 2/2007 | Biessener et al. |
| 7,233,978 B2 * | 6/2007 | Overton et al. ............. 709/217 |
| 7,293,150 B2 | 11/2007 | Witt et al. |
| 2002/0031223 A1 | 3/2002 | Knighton et al. |
| 2002/0133491 A1 | 9/2002 | Sim et al. |
| 2002/0135801 A1 | 9/2002 | Tessman, Jr. et al. |
| 2003/0163809 A1 | 8/2003 | Bantz et al. |

FOREIGN PATENT DOCUMENTS

| | | |
|---|---|---|
| JP | 10055298 (A) | 2/1998 |
| TW | 464816 | 11/2001 |
| WO | WO95/18496 | 7/1995 |
| WO | WO9518496 | 7/1995 |
| WO | WO01/35226 | 5/2001 |
| WO | WO0135226 | 5/2001 |
| WO | WO01/57640 | 8/2001 |
| WO | WO0157640 | 8/2001 |

OTHER PUBLICATIONS

European Search Report for European Patent Application No. 03013749.1 Mailed on Jan. 9, 2008 pp. 4.

* cited by examiner

METHOD AND SYSTEM FOR CREATING AND RESTORING AN IMAGE FILE

RELATED APPLICATIONS

This is a continuation of and claims priority to U.S. patent application Ser. No. 10/185,755 filed on Jun. 28, 2002, now U.S. Pat. No. 7,293,150, entitled "Method and System For Creating And Restoring An Image File" by inventors Wesley A. Witt and Edward S. Miller.

BACKGROUND

Computer systems interface to one or more storage media. The storage media stores a variety of data such as operating system files, application programs and data files used with application programs. Known storage media types include hard disks, CD ROMs, Digital Versatile Disk (DVD) and the like. The storage media is logically subdivided into one or more volumes or partitions. The storage media is further physically subdivided into a plurality of sectors. Each sector is capable of storing a plurality of bytes of data. A cluster is group of sectors and represents the smallest unit that an operating system executing in the computer uses to identify locations on the storage media. Thus, the operating system typically stores or reads data on the storage media on a cluster by cluster basis.

The data on the storage media is organized as a set of files and other control information used to manage the files on the disk. For example, each operating system file, application program or data file represents a different file on the storage media. The control information identifies which clusters on the storage media include data for each file. The control information also identifies the clusters on the storage media that are allocated, i.e. include data for a file, and the clusters that remain unallocated, i.e. are available to store new data. The precise manner that the files and control information are organized on the storage media depends upon a file system. Various known file systems exist, such as File Allocation Table 16 (FAT16), File Allocation Table 32 (FAT32) and New Technology File System (NTFS).

An image file is a copy of the data stored on a source storage media volume. Typically, the image file is a single stream of data that is a sector by sector copy of the data contained on the source storage media volume. The image file is in turn stored on a destination storage media volume. The destination storage media volume is a different volume or partition on the same storage media or, alternatively, a separate storage media. For example, an image file that represents a sector by sector copy of a hard disk volume is stored on a CD ROM.

The image file is used for at least two functions. First, the image file is used to restore the source storage media volume to its state at the time the image file was created. Thus, the image file can be used to restore the storage media volume if it becomes damaged or corrupted. Second, the image file is used to provide a plurality of computer systems with the same basic configuration.

Because the image file is created as a sector by sector copy of the source storage media, and is stored as a single data stream, it is difficult to manipulate the image file. For example, if an image file is created for the source storage media volume and the operating system files on that storage media volume are subsequently replaced with a newer version, the image file cannot readily be modified to include the new operating system files. Instead a new image file must be created. Also, if a user or system administrator wants to maintain different versions of an image file, separate image files must be created for each different version. Thus, known image file formats are resource intensive and costly to maintain.

SUMMARY

In accordance with the foregoing, an image file and a method and system for creating and restoring the image file is provided. The image file is created from source data on a source storage media volume. The image file is stored on a destination storage media volume. The image file includes a plurality of image streams. The image streams include a control stream, a data stream, a bitmap stream, and a cluster map stream. Other image streams such as an audit trail stream, a properties stream and a fix-up stream are optionally included in the image file.

The control stream forms a header for the image file that uniquely identifies the image file. The control stream also includes data that identifies the source storage media volume, such as data that identifies source storage media volume geometry, and an operating system stored on the source storage media. The control stream provides the information needed to read, restore and edit the image file.

The data stream includes data for each of a plurality of files on the source storage media volume. The data stream also includes control information from the source storage media volume. The data in the data stream is optionally compressed or encrypted. In an embodiment of the invention, the data in the data stream is defragmented when the image file is created.

The bitmap stream identifies clusters on the source storage media that are allocated to a file and the clusters that remain unallocated. The bitmap stream facilitates editing of the image file by providing a fast lookup allowing the operating system to identify locations on the source storage media available to store new data.

The cluster map stream correlates the location of a group of data on the source storage media to its location in the data stream. Optional image file streams such as the property stream and audit trail stream identify the types of files located in the image file and identify edits made to the image file.

Additional features and advantages of the invention will be made apparent from the following detailed description of illustrative embodiments that proceeds with reference to the accompanying figures.

BRIEF DESCRIPTION OF THE CONTENTS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
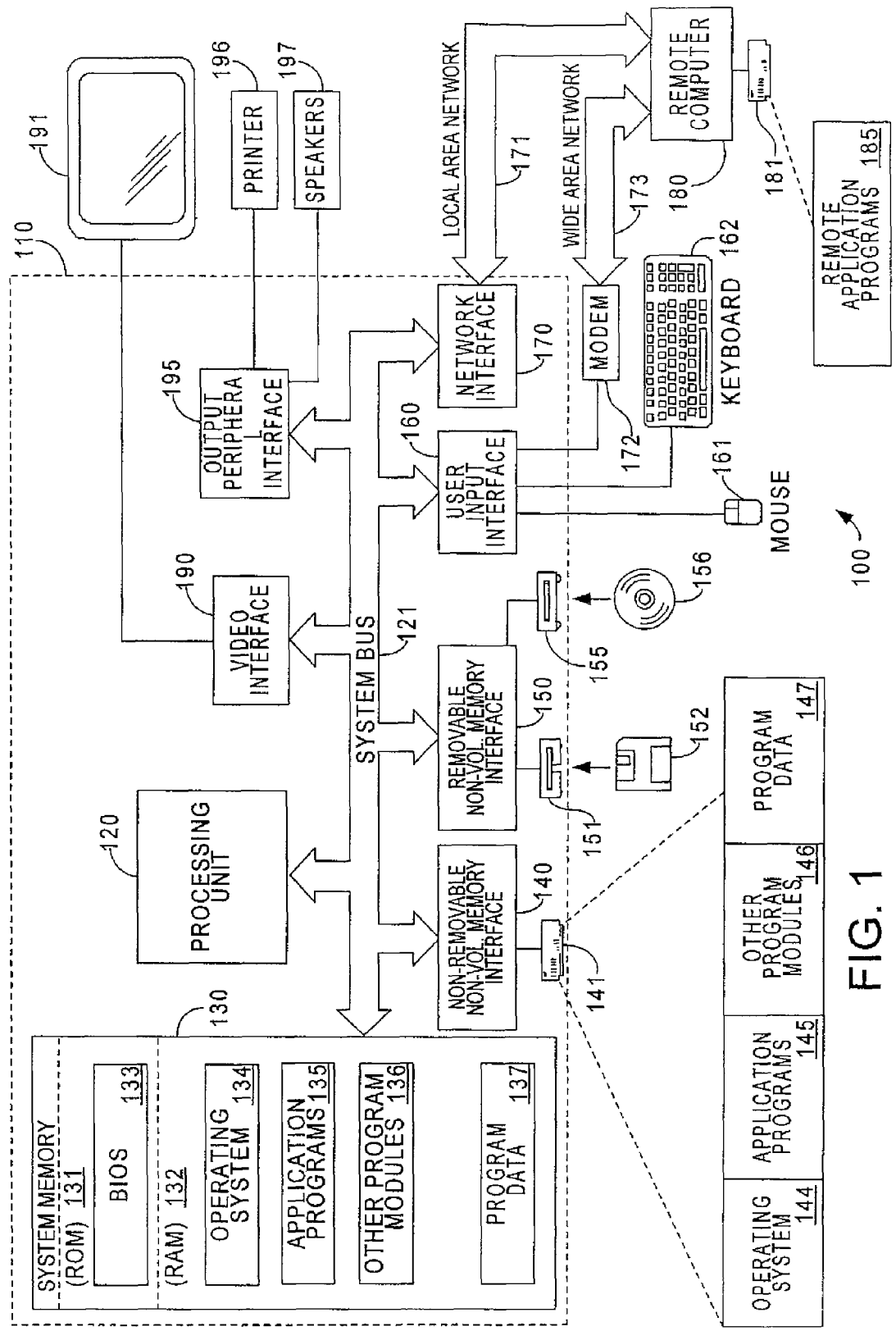
FIG. 1 is a block diagram generally illustrating an exemplary computer system on which the present invention resides.

The invention is directed to an image file and a method and system for creating and restoring the image file. The image file has a plurality of streams including a control stream, a data stream, a bitmap stream, a cluster map stream, a fix-up stream, and optionally an audit trail stream and a property stream. The data stream includes source data from a source storage media volume. The control stream, bitmap stream, cluster map stream, audit trail stream and property stream include information that allow access and editing to the source data in the data stream. The fix-up stream updates information in the plurality streams based on the organization of data within the data stream.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
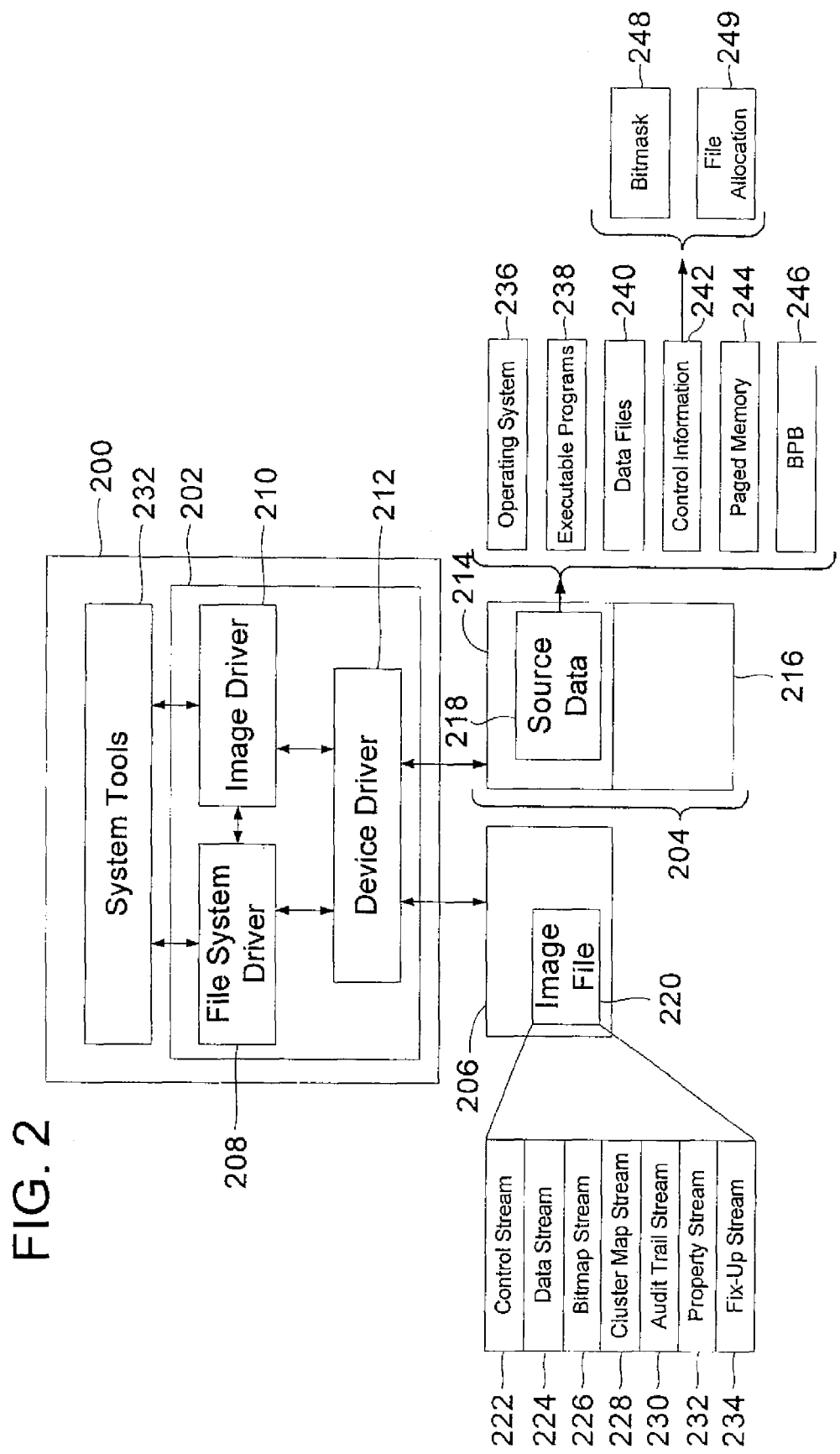
FIG. 2 is a block diagram of an operating environment used to create, restore and edit the image file.

FIG. 2 illustrates an exemplary operating arrangement and image file format used to implement the present invention. The operating arrangement includes a computer 200 interfaced to source storage media 204 and destination storage media 206. An operating system 202 executes within the computer 200. The operating system 202 includes components such as file system driver 208, image driver 210 and device driver 212 that facilitate communication between the computer 200 and the storage media 204 and 206.

Each storage media is logically divided into one or more volumes. Storage media 204 is divided into a first volume 214 and a second volume 216. Storage media 206 is divided into a single volume. The storage media 204 and 206 are defined according to a geometry. The geometry of the storage media includes a number of cylinders, tracks per cylinder and sectors per track. A sector is a physical unit on the storage media. Each sector is capable of storing a certain amount of information, for example, 512 bytes. The geometry of storage media is known and need not be described in detail herein.

A cluster is a group of one or more sectors. The operating system 202 reads information from and writes data to storage media by referencing one or more clusters on the storage media. A file system determines the number of sectors that comprise a cluster. Various known file systems exist such as File Allocation Table 16 (FAT16), File Allocation Table 32 (FAT32), Compact Disk File System (CDFS), and New Technology File System (NTFS).

As shown, the first volume 214 of the source storage media 204 includes source data 218. The source data 218 includes a plurality of files such as operating system files 236, executable programs 238 such as application programs, and data files 240 used with the application programs. The source data 218 also includes control information 242. The control information includes file allocation data 249 that identifies the clusters on the storage media volume 214 that include data for each file. The control information 242 also includes a bitmask 248. The bitmask 248 comprises a plurality of bits and each bit corresponds to one cluster on the storage media volume. The value of each bit in the bitmask identifies whether the corresponding cluster includes stored data for at least one file or whether the cluster remains unallocated.

The manner used to organize and store the control information 242 and files 236, 238, 240 depends on the file system used. By way of example, the NTFS file system stores a Master File Table (MFT) on the storage media. The MFT includes an extent list for each file stored on the storage media. The extent list includes a series of entries that identify a starting block and length. The starting block and length define a series of contiguous clusters that include data for the file.

Other information included as part of the source data 218 includes paged memory 244 and a BIOS Parameter Block (BPB). The paged memory 244 is a portion of the computer's memory that is written to the storage media 214. The BPB 246 includes data about the storage media volume such as the size of media and the location of certain files on the storage media.

The destination storage media 206 includes an image file 220. The image file is a logical capture of information, such as source data 218. In the present invention, the 30 image file 220 is used to restore the source data 218 to the source storage media volume 214. Alternatively, the image file 220 is used to provide one or more storage media volumes with the same configuration as the source storage media volume 214.

The image file 220 includes a plurality of image streams. As shown, the image file 220 includes a control stream 222, a data stream 224, a bitmap stream 226, a cluster map stream 228, an audit trail stream 230, and a property stream 232. The image streams are stored on the destination storage media 206 as part of the image file 220. The image file 220 also includes a fix-up stream 234. The fix-up stream 234 is used to modify data in the other image streams before they are written to the image file 220. In an embodiment of the invention, the audit trail stream 230 and properties stream 232 are optional.

In the embodiment shown, the destination storage media 206 and the source storage media 214 interface to the computer 200 via a common device driver 212 and file system driver 208 thereby assuming that both storage media employ a common file system and a common storage media type. As those skilled in the art will recognize, different storage media may utilize different file systems and different storage media types. For example, storage media 206 may be a CD ROM using the CDFS file system while storage media 204 may be a hard disk using FAT16 or FAT32. In that case, a plurality of file system drivers 208 and device drivers 212 may be required.

Typically, a user requests that the image file 220 be created via system tools 232. The systems tools are implemented in any suitable manner such as a user interface or command line request. Alternatively, system tools 232 are implemented as part of another program module such as an application program. The request is passed to the image driver 210 which obtains access to the source media 204 and destination media 206 via file system driver 208. Once the image driver 210 obtains access to the source and destination storage media, the operating system 202 interfaces to the storage media through the image driver 210 and the device driver 212. To create the image file, the operating system reads the source data 218, creates the plurality of image streams 222-234 and writes the image streams to the destination storage media 206. To restore the source data 218 from an image file 220, a user request to restore the source data 218 is initiated from system tools 232. The image driver 210 obtains access to the source storage media volume 214 and the image file 220 via file system driver 208. The operating system reads the image file 220 via the image driver 210 and device driver 212. The operating system 202 then restores the source data 218 to the source storage media 214 based on the data media 214 based on the data in the image file 220.

Figure 3:
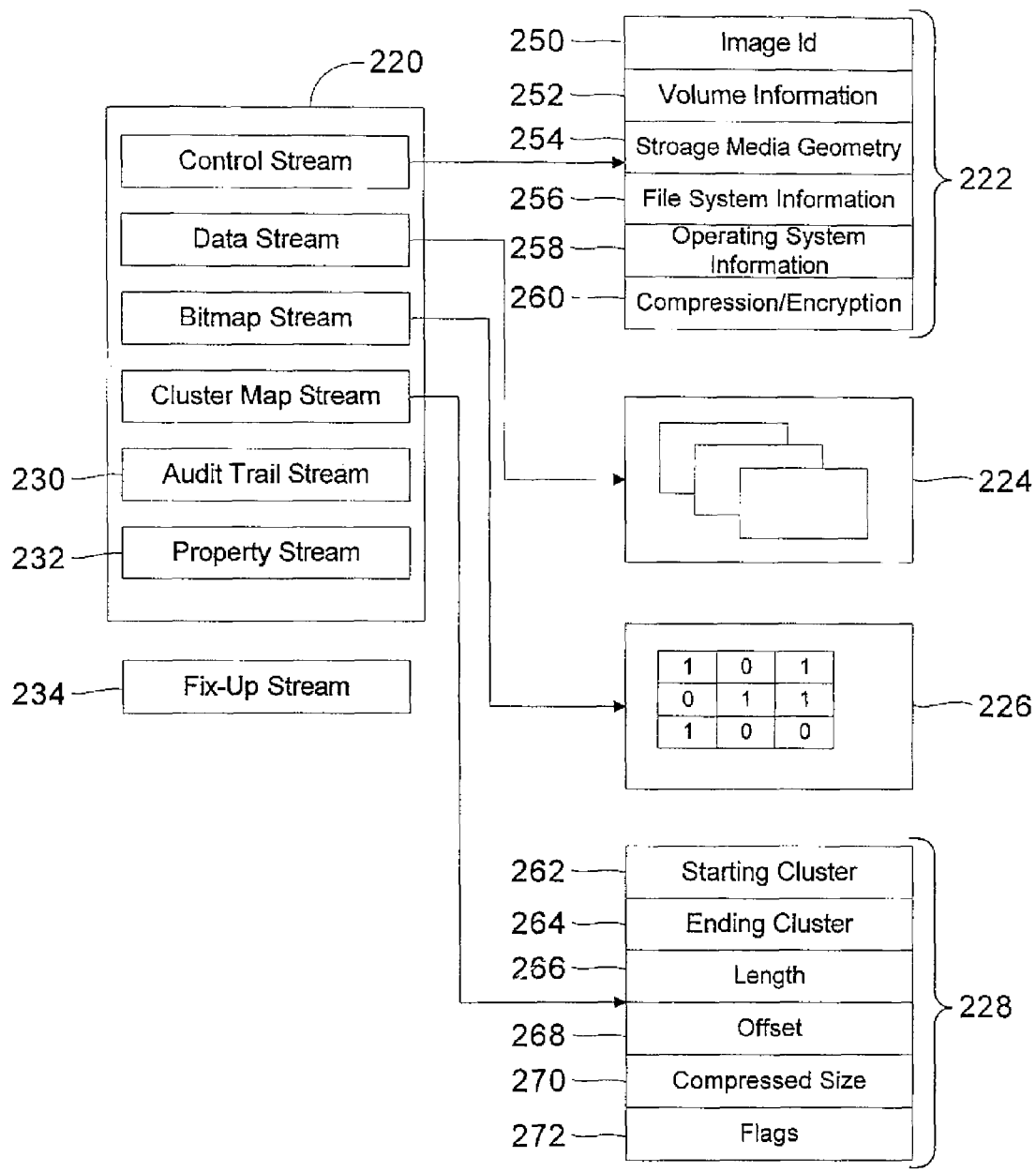
FIG. 3 is a block diagram illustrating the image file format.

FIG. 3 shows an embodiment of the image file 220 used to implement the present invention. The image file 220 includes the control stream 222, the data stream 224, the bitmap stream 226, the cluster map stream 228, the audit trail stream 230, and the property stream 232. As previously described, the audit trail stream 230 and the property streams 232 are optional and implemented to provide additional functionality to the image file 220. The fix-up stream 234 is a temporary stream used to modify data in the other image streams before the other streams are written to the image file 220.

The control stream 222 is a data structure that functions as a header describing attributes of the image file 220 needed to open and interpret other data included in the image file 220. Data in the control stream includes an image identification 250, volume information 252, storage media geometry 254, file system information 256, operating system information 258, and compression information 260.

The image identification 250 is data that uniquely identifies the image and also data that identifies a size in bytes of the control stream 222. The volume information 252 includes data that defines the source storage media volume 214. Data in the volume information 252 includes a volume offset from the beginning of the storage media 204, a length of the volume, number of hidden sectors on the volume, a volume number, and the type of file system used by the volume.

The storage media geometry 254 includes data that describes physical attributes of the source storage media 254 including the number of cylinders, the number of tracks per cylinder, and the number of sectors per track. The file system information 256 includes data that identifies the total number of clusters, bytes per cluster and number of clusters per record.

The operating system information 258 includes data that identifies an operating system version that is stored on the source storage media volume 214. The operating system information 258 also includes data that identifies any updates made to the operating system such as service pack identification. A service pack is an update to a software program that fixes known problems with the software program or that provides enhancements to the software program. The service pack identification identifies any service packs stored on the source storage media volume 214 for the operating system files 236. The compression/encryption information 260 includes data that identifies whether the image file 220 is compressed and whether the image file 220 is encrypted.

The data stream 224 includes the data for each of the files located on the target storage media volume 214. The data for each file is optionally compressed or encrypted using known methods. As described in more detail below, the decision to compress data is made on a file by file basis. Thus, some data in the data stream 224 may be compressed while other data is not. Similarly, some data in the data stream 224 may be encrypted while other data is not. The control information 242 that forms part of the source data 218 also comprises one or more files and is stored as part of the data stream 224.

In an embodiment of the invention, the data stream 224 does not include multiple copies of identical data. For example, if multiple copies of the same data file 240 are stored in the source storage media volume 214, only one copy of the data file 240 is stored in the data stream 224. Paged memory 244 also need not be included in the data stream 224. When the image file 220 is restored on a storage media volume, the operating system 220 creates paged memory 244 on the storage media volume as needed. Eliminating multiple copies of data and paged memory files reduces the size of image file 220.

The cluster map stream 228 correlates a location of data within the image file 220 to its location on the source storage media volume 214. The cluster map stream 228 comprises a series of records. FIG. 3 shows a single record within the cluster map stream 228. Each record includes a starting cluster 262 and an ending cluster 264. The starting cluster 262 and ending cluster 264 identify the starting and ending cluster where the data is located on the source storage media 214. The offset 268 identifies a starting location of the data in the data stream 224, as measured from the beginning of the data stream. For compressed files, data length in the image file 220 is equal to the compressed size 270. For uncompressed data, the data length in the image file 220 is the product of the length 266 and the number of bytes per cluster, as identified in the control stream 222. The flag field 272 identifies whether the data in the image file 220 is compressed or uncompressed.

The cluster map stream 228 provides a mechanism that allows the operating system to locate data in the data stream 224. This allows the image file to be viewed and edited.

Figure 4:
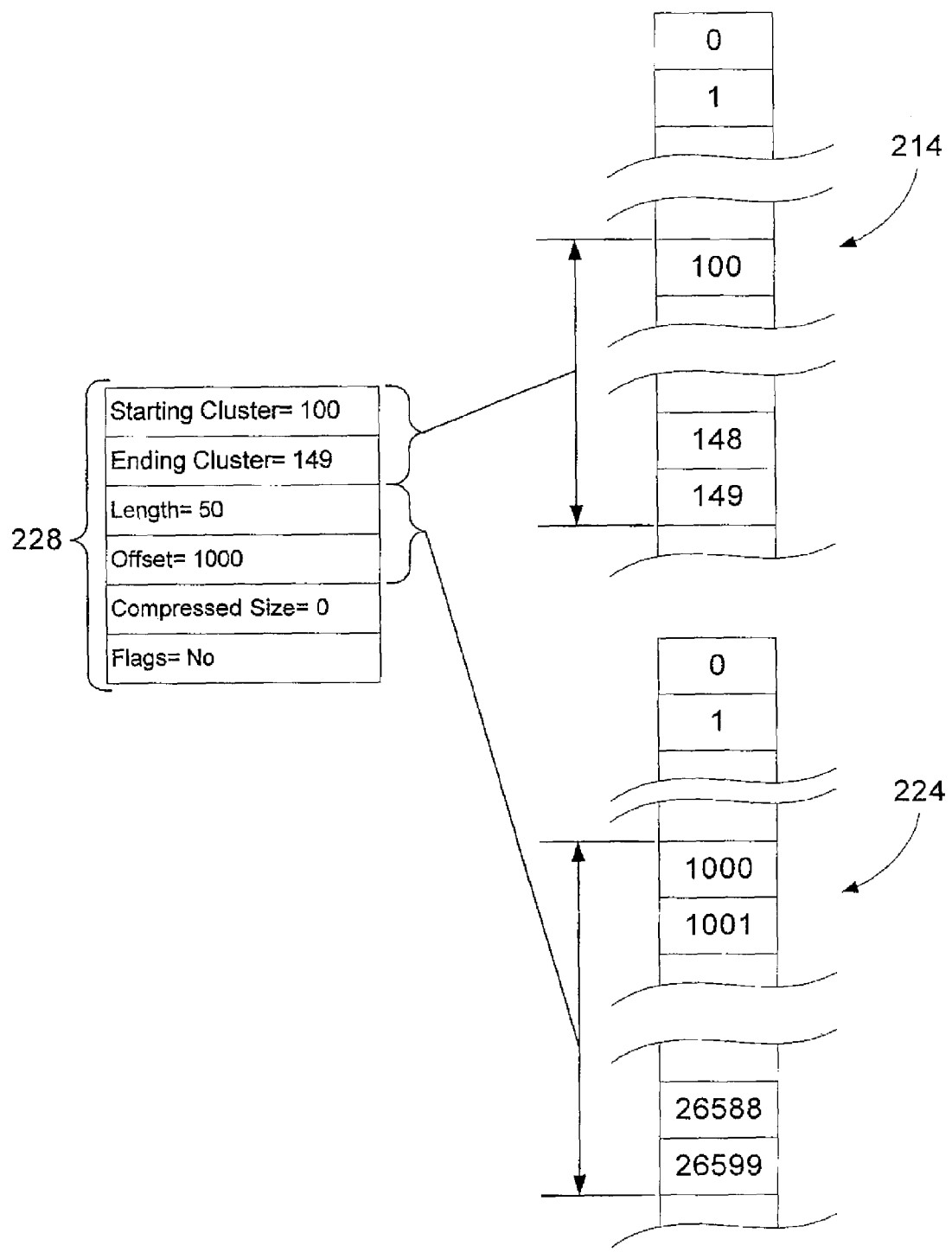
FIG. 4 is a block diagram of the cluster map stream.

Referring to FIG. 4, an example of the relationship between the location of data within the data stream 224 to its location on the source storage media volume 214 is illustrated in FIG. 4, it is assumed that the bytes per cluster is 512 as identified in the control stream 222. The source storage media volume 214 includes sequentially numbered blocks. Each bock represents one cluster on the source storage media volume. The data stream 224 also includes sequentially labeled blocks. Each block in the data stream 224 represents a be in the data stream 224 and the number represents the offset, in bytes, from the beginning of the data stream 224.

The starting cluster field 262 of the cluster map record 228 includes a starting cluster 100 and the ending cluster field 149 includes ending cluster 149. Thus, the data is stored on clusters 100 through 149 of the source storage media volume 214 as generally shown. The offset field has a value of 1000. Accordingly, the data starts at an offset of 1000 bytes from the beginning of the data stream 224. Field 272 indicates that the data is not compressed. Thus, the length of the data in the data stream 224 is the product of length, which is identified as 50 in the length field 266, and the number of bytes per cluster 512 (50 clusters*512 bytes per cluster=25,600 bytes). As shown, the corresponding data in the image file is located at bytes 1000 through 26599 as referenced from the beginning of the data stream 224.

If multiple copies of the same data is stored on the source storage media volume 214, the data is only placed in the data stream 224 one time. Where this occurs, multiple records in the cluster stream 228 are created, one record for each occurrence of the data on the source storage media volume 214. Each record includes the same length 266, offset 262, compressed size 270, and compression 272 fields and thereby point to the same data in the data stream 224. The starting cluster 262 and ending cluster 264 fields are different thereby identifying multiple locations on the source storage media 214 where the data belongs.

Returning to FIG. 3, the bitmap stream 226 is used to identify allocated and unallocated clusters of the target storage media volume 214. The allocated clusters are clusters that include data for a file on the target storage media volume 214. Unallocated clusters are clusters that are available to store new data. In the example shown, the bitmap stream is implemented as a bitmap. Each bit in the bitmap corresponds to a cluster on the target storage media 214. A bit with a value of "1" represents an allocated cluster while a bit with a value of "0" represents an unallocated cluster. The bitmap stream performs the same function as the bitmask 240. However, because the bitmap stream 226 is outside the data stream 224, it is readily accessible within the image file 220.

The audit trail stream 230 includes data that identifies any changes made to the image file, the user that initiated the change, the files, if any that were modified, and the date and time that the changes were implemented. The property stream 232 includes data that identifies attributes of the image file 220 such as operating system version. The property stream 232 is queried to identify image files 220 with desired attributes. For example, the property stream 232 is queried to locate images files that include a particular version of the operating system. The audit trail stream 230 and property stream 232 are implemented in any suitable manner.

The fix-up stream is used to modify the image streams after the source data 218 is read by the operating system 202. For example, when the source data 218 is placed in the data stream 224 it may be moved relative to its original location on the source storage media 214. The fix-up stream updates the BPB 246 and control information 242 within the data stream to reflect the proper location of the source data 218.

Figure 5A:
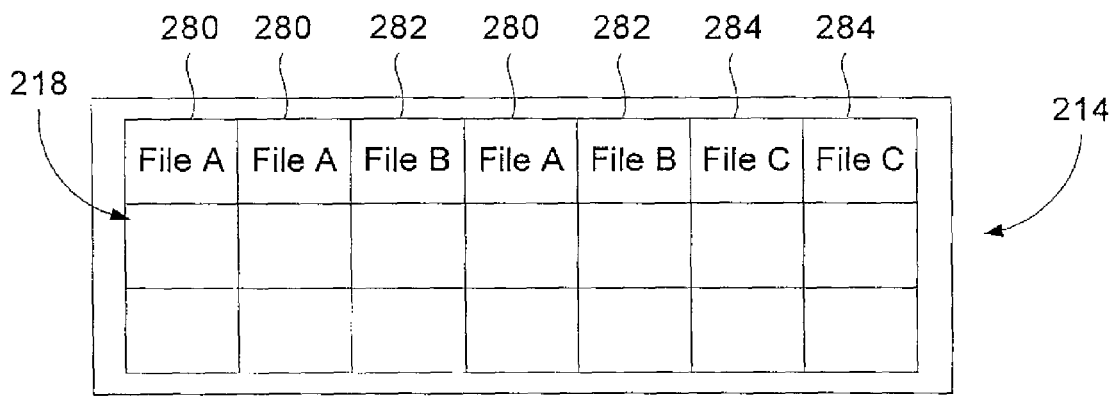
FIGS. 5a and 5b are block diagrams of source data and the data stream.
Figure 5B:
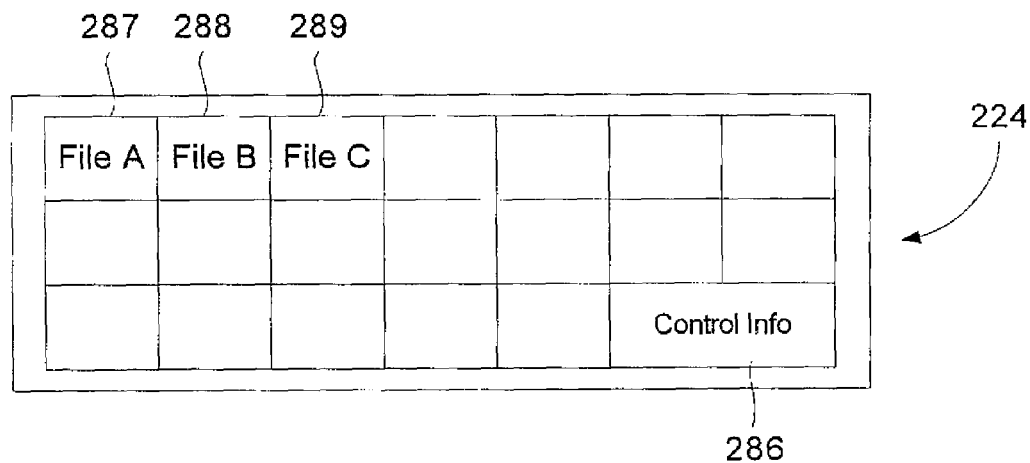

FIGS. 5a and 5b illustrate how data on the source storage media 214 is optionally defragmented when placed into the data stream 224. As shown, the source data 218 is stored on the source storage media 214. Data for File A is stored on clusters labeled 280, data for File B is stored on clusters labeled 282, and data for File C is stored on clusters labeled 284. As shown, the data for File A and the data for File B are stored on non-contiguous clusters. When the data for a file is stored on non-contiguous clusters, the file is said to be fragmented.

When the operating system 202 reads the control information 242 on the source storage media 214 for File A, it identifies the clusters containing data for the file, labeled 280, and reads the data. The operating system then places the data for File A in contiguous locations, labeled 287, within the data stream 224. The operating system 202 follows the same process for File B and File C. As shown in FIG. 5b, the data for File B and File C are placed in contiguous locations, labeled 288 and 289 respectively. Because the data is placed in contiguous locations, the operating system 202 can defragment the file by updating the file allocation 249 for each file. The method used to defragment the files on the source storage media 214 is described more fully below.

As previously described, the control information 242 including the volume bitmask 248 and the file allocation 249 for each file is stored in the data stream 224 as one or more files. The data 286 for the control information 242 is typically located at the end of the data stream 224 as shown in FIG. 5b.

When the files are defragmented, the cluster map 228 records are modified to 15 reflect the new data locations. Because the data is moved from its original location, the starting and ending cluster may not correspond to the original location of the source data on the source storage media volume. Instead, the starting and ending cluster identify the location where the data will be stored when the image file is restored to a storage media volume.

Figure 6:
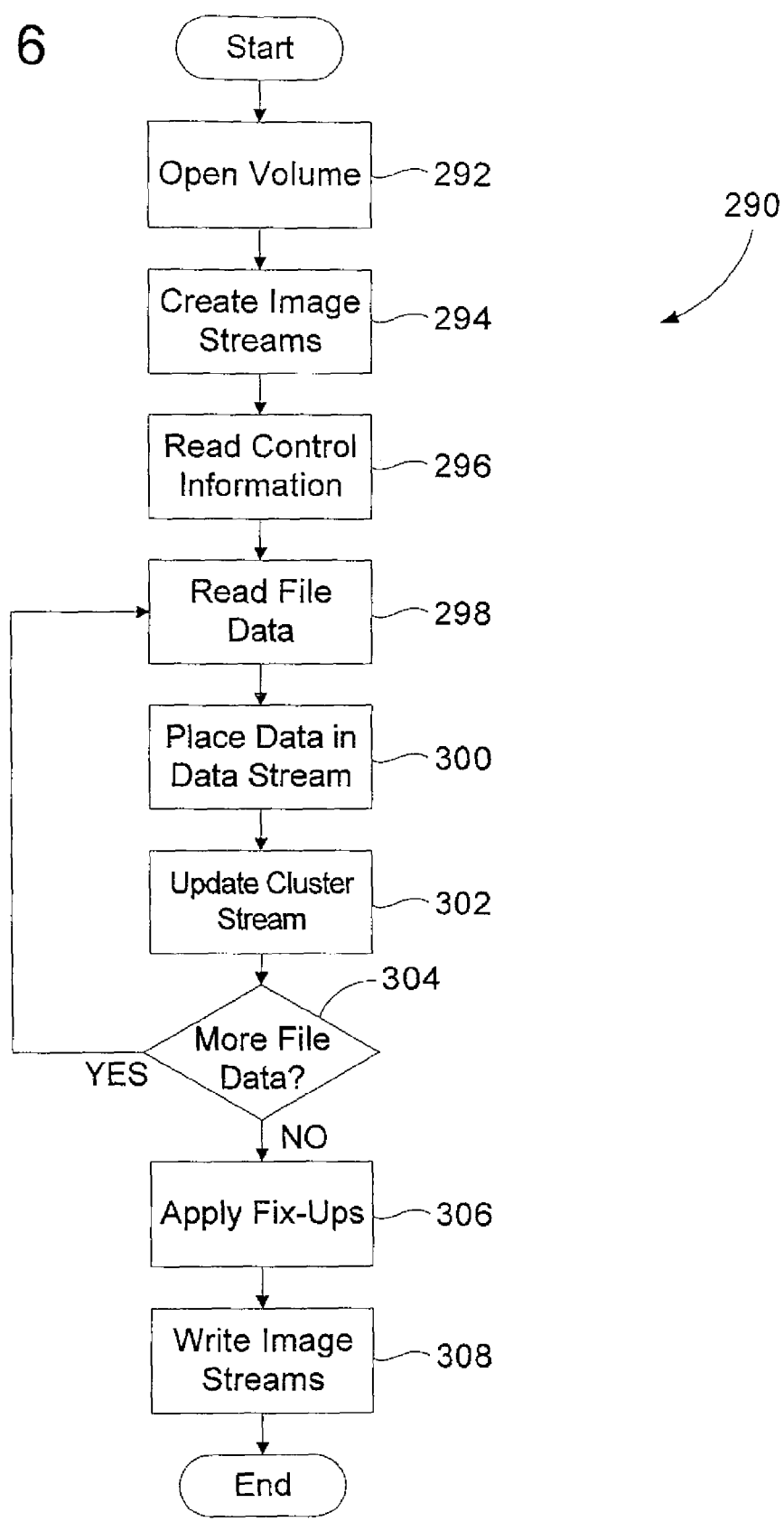
FIG. 6 is a flow chart illustrating an example of a procedure that may be followed in an embodiment of the invention.
Figure 7:
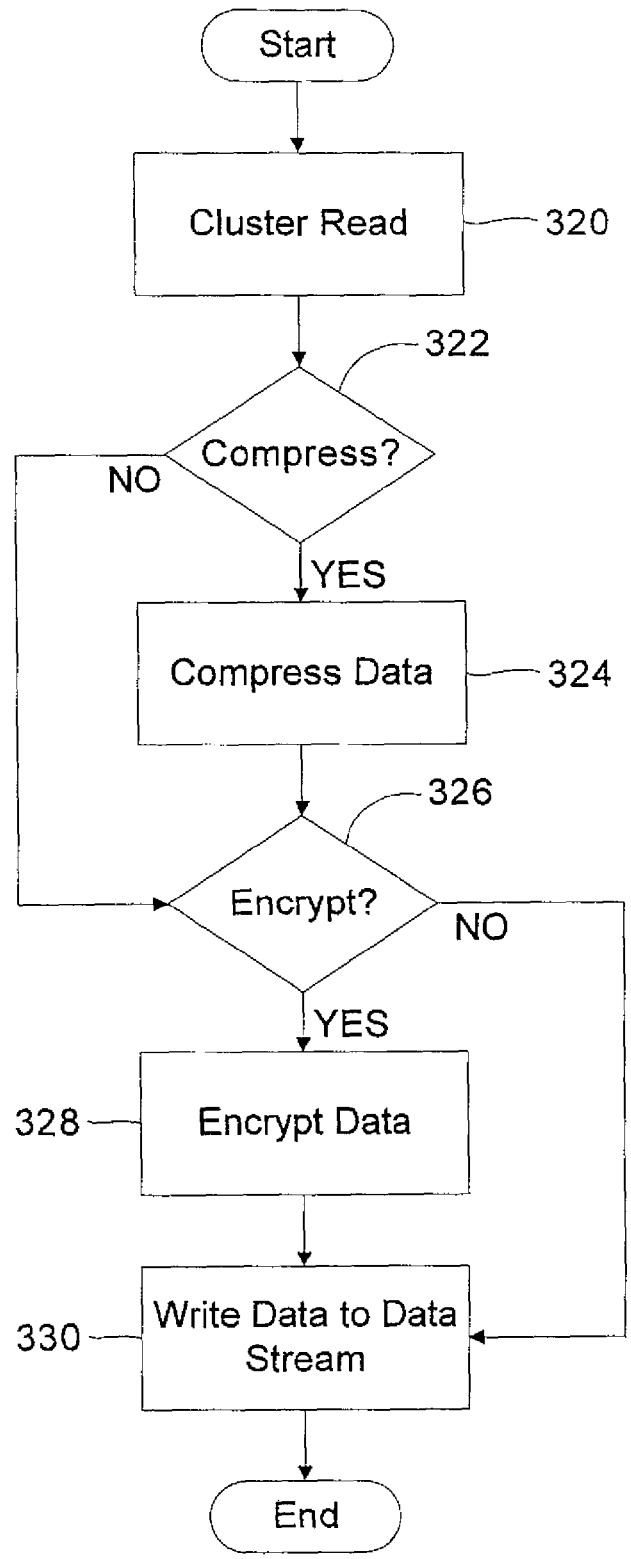
FIG. 7 is a flow chart illustrating an example of a procedure that may be followed in an embodiment of the invention.

FIGS. 6 and 7 illustrate processes used to create the image file 220 from the source storage media volume 214. By way of example, the process 290 is executed by an operating system component such as by a program module operating within image driver 210. Alternatively, the process 290 is executed in whole or in part by system tools 232. Typically, the image file 220 is created via a user request from system tools 232.

After the request is received from system tools 232, the operating system 202 opens the source storage media volume 214 as shown in step 292. To open the source storage media volume 214, the image driver 210 obtains a reference to the source storage media volume 214 via file system driver 208. Once the reference to the storage media volume 214 is obtained, the operating system 202 communicates with the storage media 214 via image driver 210 and device driver 212.

In step 294, the process 290 creates the plurality of image streams of the image file 220 including the control stream 222, the data stream 224, the bitmap stream 226, the cluster map stream 228, the audit trail stream 230, the properties stream 232 and the fix-up stream 234. At this point, the plurality of streams comprising the image file 220 are implemented as in memory structures or, alternatively, are implemented directly on the destination storage media volume 206.

In step 296, the process 290 reads the control information 242 on the source storage media volume 214. The control information 242 identifies the plurality of files on the source storage media volume 214 and the clusters allocated to each of the files. For example, if the source storage media volume uses the NTFS file system, the process 290 reads the MFT on the storage media volume 214.

In step 298, the process 290 reads the data for a first file identified by the control information 242. In step 300, the process places the data for the file in the data stream 224. As previously described, if multiple copies of the file data exist, the data is only placed in the data stream one time. Additionally, if the file data is part of paged memory 244, it need not be placed in the data stream 224. The data for the file is optionally defragmented when placed into the data stream 224.

In step 302, the cluster stream 228 is updated by adding a record that correlates the location of the data on the source storage media volume 214 to its location in the data stream 224. The cluster map stream 228 allows the operating system 202 to access and edit data within the data stream 224. In step 304 the process 290 determines whether the source storage media volume 214 includes more file data. If more file data exists, the process 290 returns to step 298 and reads the data for the next file.

If no more file data exists, the process 290 proceeds to step 306 and applies fix ups to the image file streams. The fix-ups are applied to account for data movement. For example, as previously described, the process 290 may defragment the data for the plurality of files on the source storage media 214. Thus, the process 290 modifies the control information 242 located in the data stream 224 so that control information 242 identifies the clusters now allocated to each file. In the case of an NTFS volume, the process corrects the extent list for each file in the MFT. Because the data for each file is defragmented, the extent list for each file includes a single extent. The bitmask 248 is also modified to properly reflect allocated and unallocated clusters on the target storage media in view of changes to data location. Fix-ups are also applied to the BPB 246. Because the location of files referenced in the BPB is changed, the BPB is modified so that the proper location of files is referenced.

Once the process is complete, the control stream 222, data stream 224, bitmap stream 226, cluster map stream 228, audit trail stream 230, and properties stream 232 are written to the destination storage media 206 thereby forming image file 220 as shown in step 308.

FIG. 7 illustrates a process used to encrypt and compress data from the source storage media volume 214. In step 320, the process 290 reads the data stored on the clusters identified by the control information 242. In step 322, the process 290 decides whether the compress the data. In the invention, file compression is optional and may be user selectable via system tools 232 or any suitable operator interface. If file compression is selected, the process 290 compresses the data as shown in step 324. Preferably, the data is only compressed if it is not already stored in a compressed format. The data is compressed, as shown in step 324, using any suitable compression/decompression (CODEC) algorithm.

In step 326, the process 290 determines whether to encrypt the data. In the invention, file encryption is optional and may be user selectable via system tools 232. If selected, the data is encrypted using any suitable known method as shown in step 328. Once the data is encrypted and/or compressed, if applicable, the data is written to the data stream 224 as shown in step 330.

Figure 8:
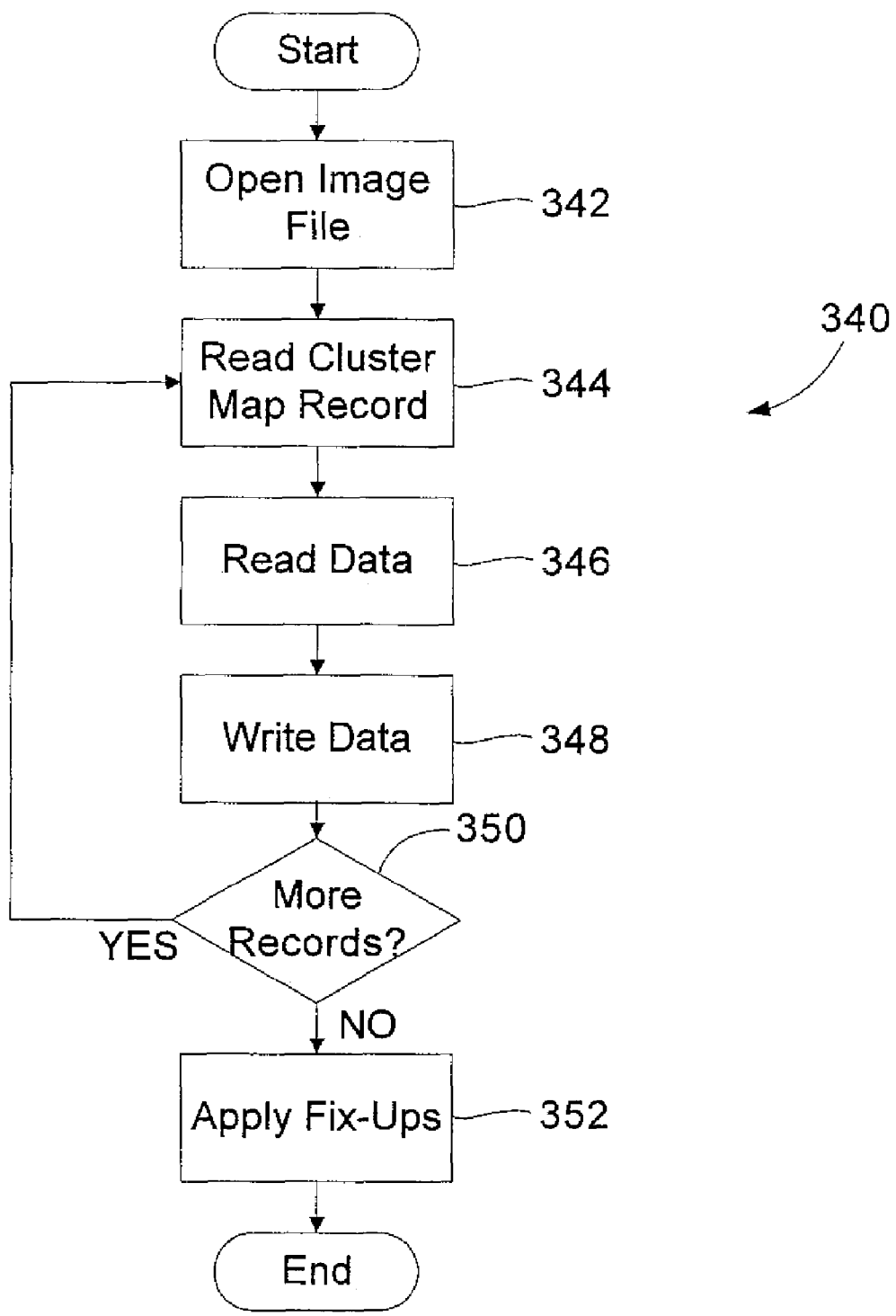
FIG. 8 is a flow chart illustrating an example of a procedure that may be followed in an embodiment of the invention.

FIG. 8 shows a process, labeled 340, used to restore the image file 220 to the source storage media volume 214. The process 340 may be executed by the operating system 202. Alternatively, the process 340 may be executed in whole or in part by system tools 232. In step 342, process 340 opens the image file 220. The operating system 202 obtains a reference to the destination storage media volume 206 via file system driver 208.

In step 344, the process 340 reads one of the plurality of the cluster map records 30 included in the cluster map stream 228. The cluster map record identifies the location in the data stream 224 for data and also identifies the intended location of the data on the source storage media volume 214. After reading the cluster map record, the data is read from the data stream 224 as shown in step 346. The data is then written to the source storage media 214 on the clusters as identified by the starting and ending clusters in the cluster map record 228.

In step 350, the process 340 determines if more records exist in the cluster map stream 228. If more records exist, the process returns to step 344 where the next cluster map record is examined. If no more records exist, the process 340 proceeds to step 352 where fix-ups are applied. The fix-ups are required if the geometry between the source storage media volume 214 used to create the image file and the storage media volume where the source data 218 is restored are different. For example, if the location of files identified in the BPB is changed, the BPB is updated to reflect the new location of the files. Also, the BPB includes geometry information of the storage media. The geometry information in the BPB needs to be updated to reflect the actual geometry of the storage media that includes the restored source data 218.

Figure 9:
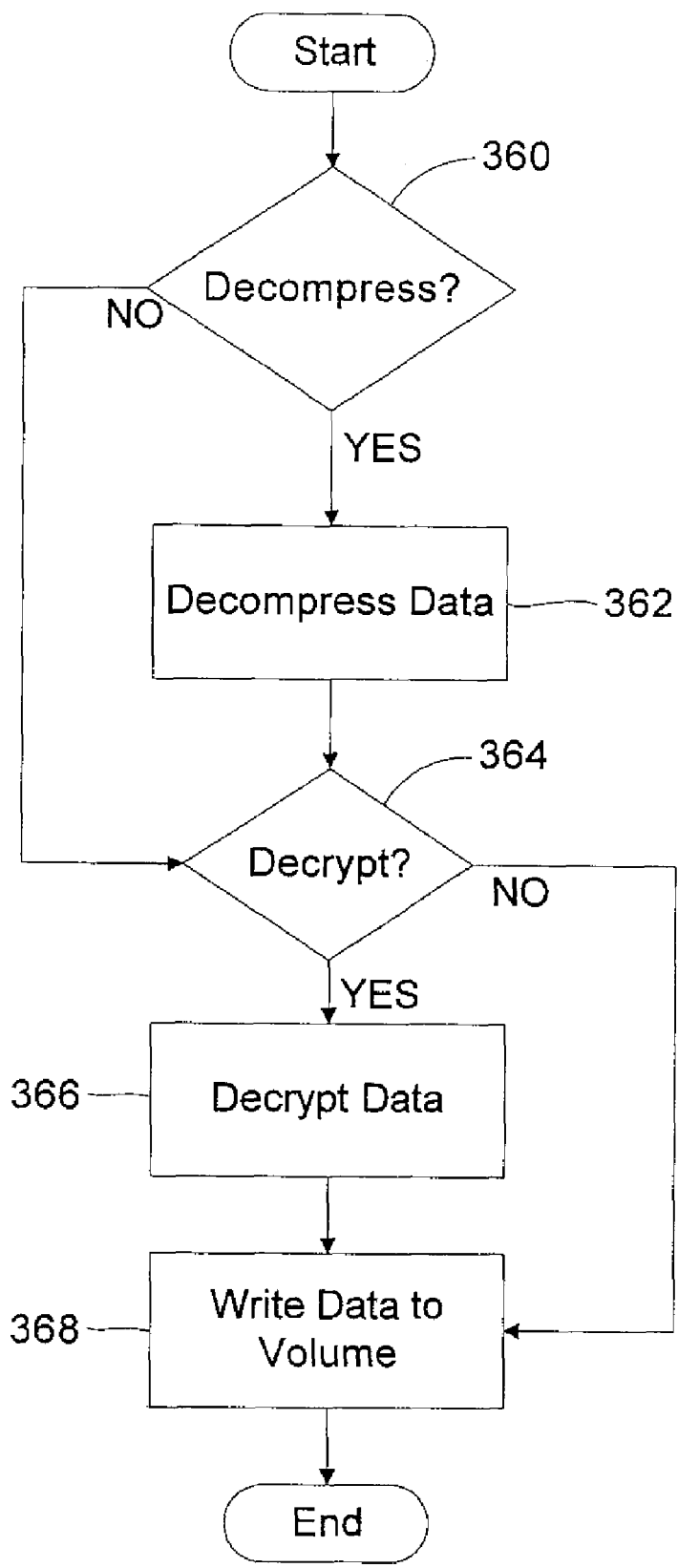
FIG. 9 is a flow chart illustrating an example of a procedure that may be followed in an embodiment of the invention.

FIG. 9 shows a process used to decrypt and decompress data from the image file 220. In step 360, the process 340 determines whether to decompress data. If the data requires decompression, the data is decompressed using known decompression algorithms as shown in step 362. In step 364, the process 340 determines whether to decrypt the data. If the data requires decryption, known decryption algorithms are used to decrypt the data as shown in step 366. Once the data is decompressed and decrypted, as needed, the data is written to the source storage volume 214. The data is written to the clusters as identified in the cluster record for the corresponding data.

All of the references cited herein, including are hereby incorporated in their entireties by reference. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A destination storage media having an image file stored thereon, wherein the image file is created from source data stored on a source storage media, the image file including a plurality of image streams, comprising:

a control stream including data identifying the image file;

a data stream containing the source data; and
a cluster map stream containing a plurality of records, each record identifying:
  a first location corresponding to a cluster location of a portion of the source data on the source media;
  a second location corresponding to a location of the portion of the source data in the data stream,
  wherein the image file is arranged to include only one copy of data in the image file when multiple copies of the same data is stored on the source media by creating in the cluster map stream multiple records each pointing to the same data stored in the data stream.

2. The destination storage media of claim 1 wherein the source data includes a plurality of files, wherein the plurality of image streams further comprising:
  a property stream that identifies at least one of the plurality of files of the source data by a unique file identifier and a version.

3. The destination storage media of claim 1 wherein the source data includes a plurality of files, wherein the plurality of image streams further comprising:
  an audit trail stream that identifies files modified subsequent to the image file being created by a file identifier.

4. The destination storage media volume of claim 1, wherein at least a portion of the source data is encrypted.

5. The destination storage media volume of claim 1, wherein at least a portion of the source data is compressed.

6. The destination storage media volume of claim 1, wherein the control stream identifies geometry of the source storage media.

7. The destination storage media volume of claim 1, wherein the source data includes a plurality of files, each file comprising a set of data and wherein the set of data for each file is stored in contiguous locations within the data stream.

8. The destination storage media of claim 1, wherein the plurality of image streams further comprising: a bitmask stream containing data identifying allocated and unallocated clusters of the source storage media.

9. A method for restoring data to a first storage media from an image file on a second storage media, wherein the image file comprises a cluster map stream and a data stream, the cluster map stream including a plurality of records and the data stream including the data to be restored to the first storage media volume comprising:
  reading, from the image file on the second storage media, a set of data that are to be restored to multiple locations on the first storage media, the reading comprising:
    reading a plurality of records, each of the plurality of records identifying:
      a first location corresponding to the set of data in the data stream on the second storage media; and
      a of second location corresponding to a cluster location for the set of data on the first storage media,
      wherein the first location in each of the plurality of records points to the same set of data in the data stream; and
      wherein the second location in each of the plurality of records points to a different location on the first storage media; and
    reading the set of data from the data stream from the first location; and
  writing the set of data to the first storage media at the different second locations.

10. The method of claim 9 wherein the set of data in the data stream is compressed, further comprising:
  decompressing the set of data before writing the data to the first storage media.

11. The method of claim 9 wherein the set of data in the data stream is encrypted, further comprising:
  decrypting the set of data before writing the data to the first storage media.

12. The method of claim 9 wherein the step of writing the data to the first storage media further comprises writing the data to a set of contiguous clusters.

13. The method of claim 9 wherein the restored data includes control information that identifies storage media geometry and a location of files, further comprising modifying the control information based on geometry of the first storage media.

14. A method for creating an image file on a destination storage media volume from source data on a source storage media volume, the source data including a plurality of files and control information that identifies a location on the source storage media containing data for each of the plurality of files, comprising:
  creating a plurality of image streams including a data stream, and a cluster map stream;
  reading the control information and identifying the cluster location of the data for at least one file on the source storage media volume;
  reading the data for the at least one file;
  writing the data for the at least one file into the data stream;
  creating a cluster map record identifying the cluster location of the data on the source storage media volume and a location of the data in the data stream;
  adding the cluster map record to the cluster map stream;
  reading the data for another file, wherein the data for the other file is the same as the data that have been previously written into the data stream;
  adding to the cluster map stream a new cluster record identifying the cluster location of the data for the other file on the source storage media volume and the location of the same data that have been previously written in the data stream without writing the same data in the data stream; and
  writing the plurality of image streams to the destination storage media.

15. The method of claim 14 wherein the plurality of streams further comprises a fix-up stream, further comprising:
  modifying the control information and the cluster map record to identify a new location of the data on the source storage media volume.

16. The method of claim 14, further comprising: encrypting the data for the at least one file.

17. The method of claim 14, further comprising: compressing the data for the at least one file.

18. The method of claim 14, wherein the step of writing the data for the at least one file into the data stream comprises writing the data to contiguous locations within the data stream and wherein the cluster map record identifies contiguous locations of the data on the source storage media volume.

19. A computer-readable storage medium having computer executable instruction encoded thereon for creating an image file on a destination storage media volume from source data on a source storage media volume, the source data including a plurality of files and control information that identifies a location on the source storage media containing data for each of the plurality of files via operations comprising:
  creating a plurality of image streams including a data stream, and a cluster map stream;
  reading the control information and identifying the location of the data for at least one file on the source storage media volume;

reading the data for the at least one file;
writing the data for a first instance of the at least one file into the data stream;
creating a cluster map record identifying the location of each instance of the data on the source storage media volume and a location of the data for the first instance of the data in the data stream;
adding the cluster map record to the cluster map stream;
reading the data for another file, wherein the data for the other file is the same as the data that have been previously written into the data stream;
adding to the cluster map stream a new cluster record identifying the cluster location of the data for the other file on the source storage media volume and the location of the same data that have been previously written in the data stream without writing the same data in the data stream; and
writing the plurality of image streams to the destination storage media.

20. The computer-readable storage medium of claim 19, wherein the operations further comprise: encrypting the data for the at least one file.

21. The computer-readable storage medium of claim 19, wherein the operations further comprise: compressing the data for the at least one file.

22. The computer-readable storage medium of claim 19, wherein the operation of writing the data for the at least one file into the data stream comprises writing the data to contiguous locations within the data stream and wherein the cluster map record identifies contiguous locations of the data on the source storage media volume.

23. A computer-readable storage medium having computer executable instructions encoded thereon for restoring data to a first storage media from an image file on a second storage media, wherein the image file comprises a cluster map stream and a data stream, the cluster map stream including a plurality of records and the data stream including the data to be restored to the first storage media volume via operations comprising:
reading, from the image file on the second storage media, a set of data that are to be restored to multiple locations on the first storage media, the reading comprising:
reading the plurality of records, each of the plurality of records identifying:
a first location, the first location corresponding to a location of a set of data in the data stream; and
a second location, the second location corresponding to a physical location for the set of data on the first storage media;
wherein the first location in each of the plurality of records points to the same set of data in the data stream on the second storage media; and
wherein the second location in each of the plurality of records points to a different physical location on the first storage media; and
reading the set of data from the data stream from the first location; and
writing the set of data to the first storage media at the different second physical locations.

24. The computer-readable storage medium of claim 23 wherein the set of data in the data stream is compressed, and the operations further comprising:
decompressing the set of data before writing the data to the first storage media.

25. The computer-readable storage medium of claim 23 wherein the set of data in the data stream is encrypted, and the operations further comprising:
decrypting the set of data before writing the data to the first storage media.

* * * * *

UNITED STATES PATENT AND TRADEMARK OFFICE
CERTIFICATE OF CORRECTION

| | |
|---|---|
| PATENT NO. | : 7,818,532 B2 |
| APPLICATION NO. | : 11/862910 |
| DATED | : October 19, 2010 |
| INVENTOR(S) | : Wesley Witt et al. |

It is certified that error appears in the above-identified patent and that said Letters Patent is hereby corrected as shown below:

In column 13, line 52, in Claim 9, delete "a of" and insert -- a --, therefor.

Signed and Sealed this
Eighth Day of February, 2011

David J. Kappos
*Director of the United States Patent and Trademark Office*